United States Patent
Shiraishi et al.

(10) Patent No.: US 12,549,111 B2
(45) Date of Patent: Feb. 10, 2026

(54) DISCHARGE DEVICE AND ELECTRIC COMPRESSOR

(71) Applicant: KABUSHIKI KAISHA TOYOTA JIDOSHOKKI, Aichi-ken (JP)

(72) Inventors: Kazuhiro Shiraishi, Aichi-ken (JP); Keiji Yashiro, Aichi-ken (JP); Yuzuki Ando, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 172 days.

(21) Appl. No.: 18/594,094

(22) Filed: Mar. 4, 2024

(65) Prior Publication Data
US 2024/0305214 A1     Sep. 12, 2024

(30) Foreign Application Priority Data
Mar. 10, 2023   (JP) .................................. 2023-037680

(51) Int. Cl.
*H02M 7/44*     (2006.01)
*F25B 31/02*    (2006.01)
*H02M 7/48*     (2007.01)

(52) U.S. Cl.
CPC .............. *H02M 7/48* (2013.01); *F25B 31/02* (2013.01)

(58) Field of Classification Search
CPC .................................. H02M 7/48; F25B 31/02
See application file for complete search history.

(56) References Cited

U.S. PATENT DOCUMENTS

| | | | |
|---|---|---|---|
| 8,599,583 B2* | 12/2013 | Nishibori | H02M 1/32 363/127 |
| 9,559,527 B2* | 1/2017 | Jeong | H02J 3/00 |
| 9,991,783 B2* | 6/2018 | Voegele | H02M 1/32 |
| 2012/0207505 A1* | 8/2012 | Kobayashi | H02M 1/32 399/88 |

FOREIGN PATENT DOCUMENTS

| | | |
|---|---|---|
| JP | 2012-205428 | 10/2012 |
| JP | 2016-86578 | 5/2016 |
| JP | 2019-213271 | 12/2019 |
| JP | 2020-156158 | 9/2020 |

* cited by examiner

*Primary Examiner* — Adolf D Berhane
(74) *Attorney, Agent, or Firm* — Greenblum & Bernstein, P.L.C.

(57) ABSTRACT

A discharge device includes a capacitor, first and second discharge circuits each connected in parallel to the capacitor, and a comparator. The first discharge circuit includes a first discharge resistor. The second discharge circuit includes: a second discharge resistor smaller in resistance value than the first discharge resistor; and a switch connected in series to the second discharge resistor. The comparator turns off the switch when a voltage (VH) between power lines is equal to or higher than a prescribed voltage, and turns on the switch when the voltage becomes lower than the prescribed voltage. The comparator is configured to turn off the switch after an elapse of a prescribed time period since turning on of the switch.

4 Claims, 2 Drawing Sheets

DISCHARGE DEVICE AND ELECTRIC COMPRESSOR

CROSS REFERENCE TO RELATED APPLICATIONS

This nonprovisional application is based on Japanese Patent Application No. 2023-037680 filed on Mar. 10, 2023 with the Japan Patent Office, the entire contents of which are hereby incorporated by reference.

BACKGROUND

The present disclosure relates to a discharge device and an electric compressor including the same.

DESCRIPTION OF THE BACKGROUND ART

Japanese Patent Laying-Open No. 2012-205428 discloses an inverter device including: a capacitor connected in parallel to a battery; and a discharge circuit capable of discharging the capacitor. The discharge circuit includes a first resistor and a second resistor smaller in resistance value than the first resistor. In this inverter device, when the voltage of the capacitor lowers to be equal to or lower than a prescribed voltage value lower than a battery voltage value required for traveling of a vehicle, the electric charge stored in the capacitor is forcibly discharged to the second resistor.

In the above-described inverter device, when the voltage of the capacitor is higher than the prescribed voltage value, no current flows through the second resistor, and when the voltage of the capacitor becomes equal to or lower than the prescribed voltage value, a current flows through the second resistor. In such a configuration, when the voltage of the capacitor is kept at about the prescribed voltage value while a current flows through the second resistor, heat generation and loss in the second resistor are maximized. Further, when the capacitor attains a maximum voltage, heat generation and loss in the first resistor are maximized.

Although discharge of the capacitor can be accelerated by reducing the resistance value of the second resistor, there is a limit in reducing the resistance value of the second resistor due to restrictions such as heat generation and allowable loss in the second resistor. When the resistance value of the second resistor cannot be reduced, discharge of the capacitor can be accelerated by reducing the resistance value of the first resistor. However, when the resistance value of the first resistor is reduced, heat generation and loss in the first resistor are increased. Such problems are not particularly taken into consideration in Japanese Patent Laying-Open No. 2012-205428.

SUMMARY

The present disclosure has been made in order to solve the above-described problems, and an object of the present disclosure is to provide: a discharge device capable of achieving both discharge characteristics and suppression of loss in a discharge circuit; and an electric compressor including the discharge device.

A discharge device of the present disclosure includes: a capacitor connected between a pair of power lines; a first discharge circuit connected in parallel to the capacitor; a second discharge circuit connected in parallel to the capacitor; and a drive circuit. The first discharge circuit includes a first discharge resistor. The second discharge circuit includes: a second discharge resistor smaller in resistance value than the first discharge resistor; and a switch connected in series to the second discharge resistor. The drive circuit turns off the switch when the voltage between the pair of power lines is equal to or higher than a prescribed voltage, and turns on the switch when the voltage between the pair of power lines becomes lower than the prescribed voltage. The drive circuit is configured to turn off the switch after an elapse of a prescribed time period since turning on of the switch.

In the present discharge device, when the voltage between the pair of power lines becomes lower than a prescribed voltage, the switch is turned on, and a current flows through the second discharge resistor smaller in resistance value than the first discharge resistor. Thereby, while the discharge characteristics are ensured, there is a concern about heat generation and loss in the second discharge resistor. In the present discharge device, however, the drive circuit is configured to turn off the switch after an elapse of a prescribed time period since turning on of the switch, and thus, the time period during which heat generation and loss occur in the second discharge resistor can be limited to a prescribed time period. Therefore, according to the present discharge device, both discharge characteristics and suppression of loss can be achieved.

The first discharge resistor may be configured to lower the voltage between the pair of power lines from the prescribed voltage to a specified voltage within a specified time period when the capacitor is discharged through the first discharge resistor.

According to such a configuration, even if the switch is turned off after an elapse of a prescribed time period since turning on of the switch, the voltage between the pair of power lines can be lowered to the specified voltage by the first discharge resistor within the specified time period.

The discharge device may further include a power supply circuit that generates operating power for the drive circuit and the switch, and the drive circuit may include a timer for counting the prescribed time period. The power supply circuit may include: a Zener diode connected between the first discharge resistor and a negative electrode line of the pair of power lines; and a power supply node connected to a connection portion between the first discharge resistor and a cathode of the Zener diode. The drive circuit and the switch may receive the operating power from the power supply node.

According to such a configuration, the drive circuit including the timer and the switch can be operated without receiving power supply from an auxiliary power supply system (a low-voltage power supply system). Thus, even when the auxiliary power supply system stops power supply, the drive circuit and the switch can be operated.

Further, an electric compressor of the present disclosure includes: a refrigerant compression unit; a motor that drives the refrigerant compression unit; an inverter that drives the motor; and the above-mentioned discharge device provided in a pair of power lines through which electric power is supplied from a battery to the inverter.

The present electric compressor includes the above-mentioned discharge device, and therefore, can achieve both discharge characteristics and suppression of loss in the discharge device.

The foregoing and other objects, features, aspects, and advantages of the present disclosure will become apparent from the following detailed description, which is understood in conjunction with the accompanying drawings.

DESCRIPTION OF THE PREFERRED EMBODIMENTS

Figure 1:
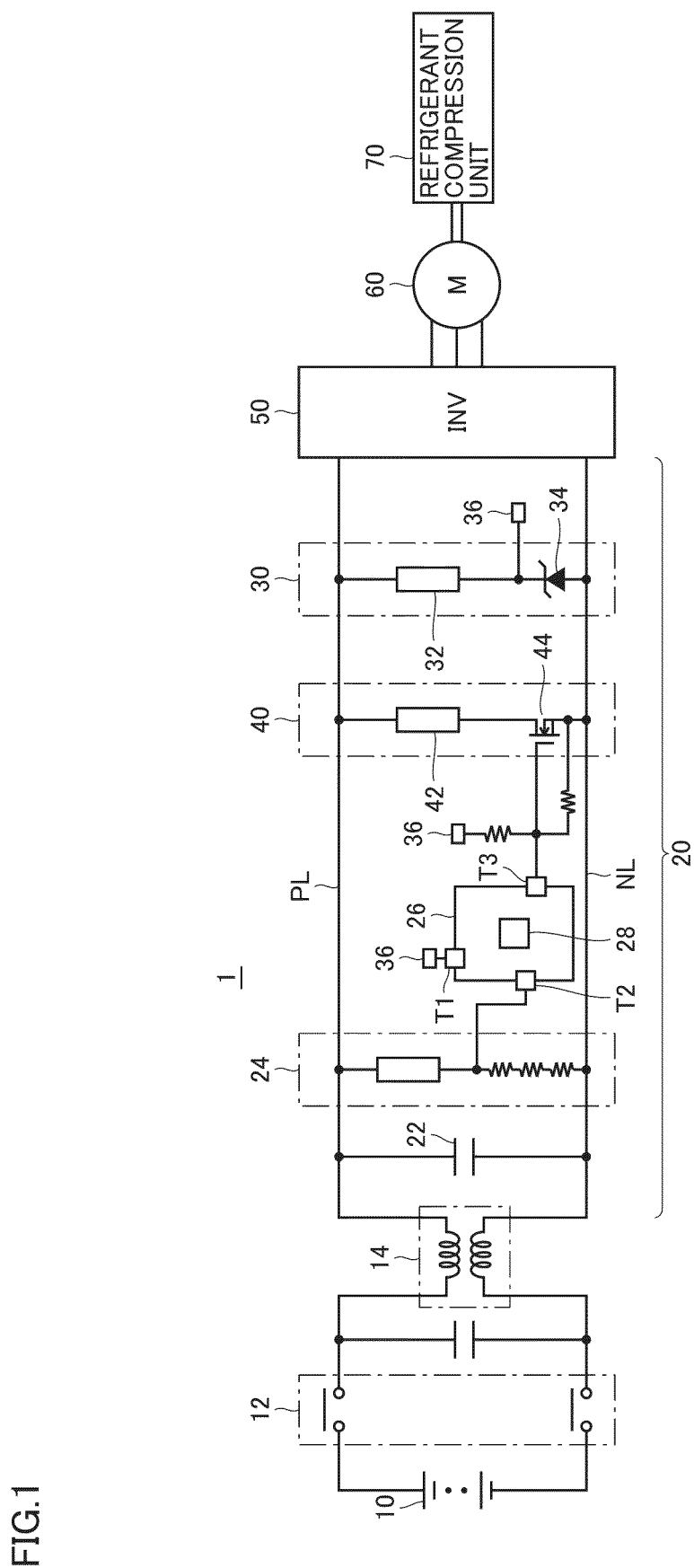
FIG. 1 is an overall configuration diagram of an electric compressor to which a discharge device according to an embodiment of the present disclosure is applied.

The embodiments of the present disclosure will be hereinafter described in detail with reference to the accompanying drawings, in which the same or corresponding portions are denoted by the same reference characters, and the description thereof will not be repeated.

FIG. 1 is an overall configuration diagram of an electric compressor to which a discharge device according to an embodiment of the present disclosure is applied. Referring to FIG. 1, an electric compressor 1 includes an inverter 50, a motor 60, a refrigerant compression unit 70, and a discharge device 20.

The inverter 50 receives direct-current (DC) power supplied from a battery 10 having a high voltage (for example, more than up to 800V) through a system relay 12, a filter 14, and a pair of power lines PL and NL, and converts the received DC power into alternating-current (AC) power to drive the motor 60. The motor 60 is, for example, a three-phase AC motor and drives the refrigerant compression unit 70. The refrigerant compression unit 70 compresses refrigerant used in a refrigeration cycle apparatus (not shown). The refrigerant compression unit 70 may be configured in various types of structures, for example, including a scroll type, a rotary type, a screw type, and the like. The electric compressor 1 is used, for example, as a compressor of a refrigeration cycle apparatus used in an air conditioner of an automobile.

The discharge device 20 includes a capacitor 22, a voltage detection circuit 24, a comparator 26, discharge circuits 30 and 40, and a power supply node 36.

The capacitor 22 is connected between the power line PL (a positive electrode line) and the power line NL (a negative electrode line), and suppresses a voltage variation (ripple) occurring in the pair of power lines PL and NL.

The voltage detection circuit 24 serves to detect a voltage VH between the pair of power lines PL and NL. The voltage detection circuit 24 includes, for example, a plurality of high-resistance voltage-dividing resistors connected in series between the power lines PL and NL, and a voltage divided by the voltage-dividing resistors is input to a terminal T2 (a SENSE terminal) of the comparator 26. Since the voltage input to the terminal T2 is proportional to the voltage VH, the voltage VH can be detected based on the voltage input to the terminal T2.

The comparator 26 is formed of an integrated circuit (IC) and operates with operating power supplied from the power supply node 36 and received at a terminal T1 (a VDD terminal). The comparator 26 compares the voltage input through the terminal T2 with a reference voltage and thereby compares the voltage VH with a prescribed voltage, and, through a terminal T3 (an OUT terminal), outputs a signal that is switched in signal level (H/L) in accordance with the comparison result.

The signal output from the terminal T3 is output to a switch 44 (described later) of the discharge circuit 40, and the comparator 26 drives the switch 44 by the signal output from the terminal T3. Specifically, by the signal output from the terminal T3, the comparator 26 turns off the switch 44 when the voltage VH is equal to or higher than a prescribed voltage, and turns on the switch 44 when the voltage VH becomes lower than the prescribed voltage. The comparator 26 corresponds to an example of the "drive circuit".

The comparator 26 incorporates a timer 28. When the voltage VH becomes lower than the prescribed voltage, the timer 28 is started to count time and used to detect whether or not the voltage VH has been kept lower than the prescribed voltage for a prescribed time period (for example, for about several seconds). Then, when the voltage VH becomes lower than the prescribed voltage, the comparator 26 turns on the switch 44 and starts the timer 28 to count time. Then, when the prescribed time period has elapsed since the start of counting time, the comparator 26 turns off the switch 44. The prescribed voltage, the prescribed time period, and the operation of the comparator 26 will be described later in detail.

The discharge circuit 30 is connected between the power lines PL and NL, and includes a discharge resistor 32 and a Zener diode 34. The discharge circuit 30 is connected in parallel to the capacitor 22. Thus, for example, upon collision of a vehicle equipped with the electric compressor 1, the system relay 12 is turned off and the electric compressor 1 is disconnected from the battery 10, and thereafter, the discharge circuit 30 can discharge the residual charge from the capacitor 22.

The Zener diode 34 is connected between the discharge resistor 32 and the power line NL, and has an anode connected to the power line NL and a cathode connected to the discharge resistor 32. The Zener diode 34 is designed such that a Zener voltage attains to the operating voltage for the comparator 26 and the switch 44 (described later) of the discharge circuit 40. For example, the Zener diode 34 is designed such that the Zener voltage attains to 15V.

The power supply node 36 is connected to a connection portion between the discharge resistor 32 and the cathode of the Zener diode 34. The power supply node 36 is supplied with electric power from the battery 10 through the power line PL and the discharge resistor 32, and produces a voltage corresponding to the Zener voltage of the Zener diode 34. Then, the comparator 26 including the timer 28 and the switch 44 of the discharge circuit 40 operate with the operating power received from the power supply node 36.

The discharge circuit 40 is also connected between the power lines PL and NL, and includes a discharge resistor 42 and the switch 44. The discharge circuit 40 is also connected in parallel to the capacitor 22 and capable of discharging the residual charge from the capacitor 22 in a manner similar to the discharge circuit 30. The discharge circuit 40 is provided to allow discharging of the capacitor 22 within a specified time period while suppressing loss in the discharge circuit 30, and the resistance value of the discharge resistor 42 is smaller than the resistance value of the discharge resistor 32 in the discharge circuit 30.

From the viewpoint of safety, the specified time period defines a discharge time period, which is 5 seconds, for example, during which the capacitor 22 is discharged starting from the maximum voltage (the maximum value of the voltage VH) to a specified voltage (for example, 60V).

The switch 44 is connected in series to the discharge resistor 42, and, in the present example, is connected between the discharge resistor 42 and the power line NL.

The switch 44 is formed, for example, of switching elements such as a metal oxide semiconductor field effect transistor (MOSFET) and a bipolar transistor. The switch 44 receives operating power from the power supply node 36 and is driven on/off by a signal output from the terminal T3 (the OUT terminal) of the comparator 26.

The discharge circuit 40 does not function when the switch 44 is turned off, but can discharge the residual charge from the capacitor 22 through the discharge resistor 42 when the switch 44 is turned on.

In the present electric compressor 1, for example, upon collision of a vehicle equipped with the electric compressor 1, the system relay 12 is turned off and the electric compressor 1 is disconnected from the battery 10, and thereafter, the residual charge in the capacitor 22 is discharged by the discharge device 20.

The capacitor 22 stores electric charge corresponding to the voltage of the battery 10. Thus, from the viewpoint of safety, the electric compressor 1 is required to include a discharge device capable of discharging the capacitor 22 from a maximum voltage (corresponding to the maximum voltage of the battery 10) to a specified voltage (for example, 60V) within a specified time period (for example, 5 seconds).

In the discharge device 20 according to the present embodiment, the capacitor 22 is discharged in two stages by using two discharge circuits 30 and 40 connected in parallel, thereby suppressing loss in the discharge device 20 while keeping the specified time period. Specifically, the discharge circuit 30 including the discharge resistor 32 having a relatively large resistance value is used in a region in which the voltage VH may be high and a significant loss may occur in the discharge resistor. In addition, the discharge circuit 40 capable of performing discharge at high speed by the discharge resistor 42 smaller in resistance value than the discharge resistor 32 is also used in a region in which the voltage VH lowers to some extent. Thereby, loss is suppressed while keeping the above-mentioned specified time period.

Figure 2:
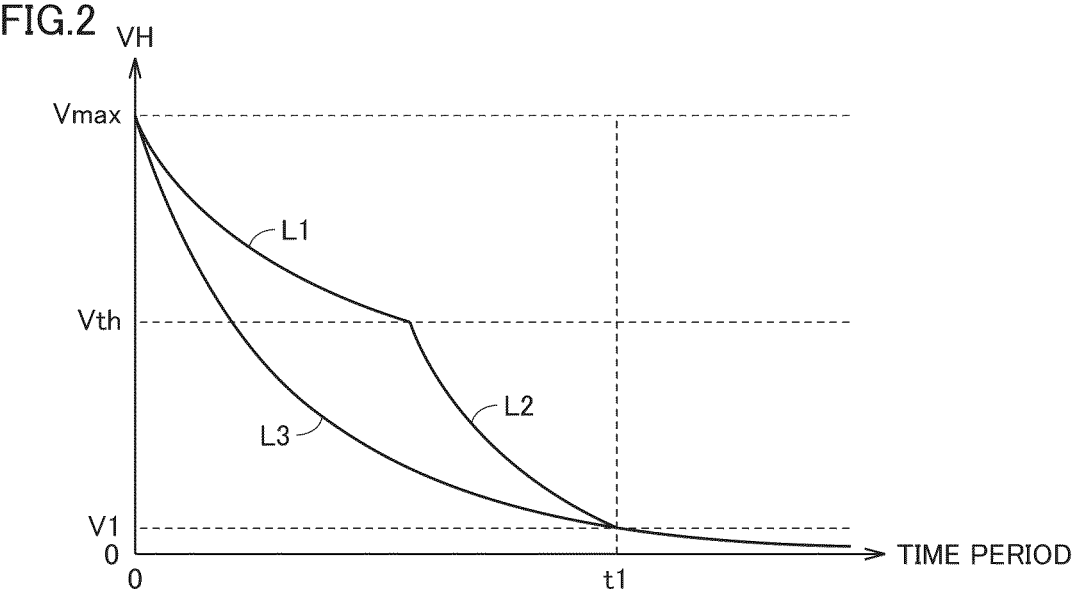
FIG. 2 is a diagram illustrating a relation between a voltage of a capacitor and a time period of discharge by the discharge device.

FIG. 2 is a diagram illustrating the relation between the voltage VH of the capacitor 22 and the time period of discharge by the discharge device 20. In FIG. 2, the vertical axis represents the voltage VH between the pair of power lines PL and NL to which the capacitor 22 is connected while the horizontal axis represents the discharge time period elapsed since the electric compressor 1 is disconnected from the battery 10 (the system relay 12 is turned off) and the discharge by the discharge device 20 is started.

Referring to FIG. 2, a voltage Vmax represents the maximum value of the voltage VH and corresponds to the maximum voltage of the battery 10. In other words, the voltage Vmax corresponds to a voltage at the time when the battery 10 is fully charged, and is higher than 800V, for example. At a time t1 and a voltage V1 showing values required for the discharge characteristics required for the discharge device 20, from the viewpoint of safety, the capacitor 22 is required to be discharged starting from the voltage Vmax to a specified voltage V1 (for example, 60V) within a specified time period t1 (for example, 5 seconds).

Lines L1 and L2 indicate changes in the voltage VH at the time when the capacitor 22 is discharged by the discharge circuits 30 and 40. For reference sake, a line L3 indicates changes in the voltage VH at the time when the capacitor 22 is discharged by one discharge circuit (a discharge resistor).

The line L1 indicates changes in the voltage VH at the time when discharge is performed by the discharge circuit 30 including the discharge resistor 32 having a relatively large resistance value. The line L2 indicates changes in the voltage VH at the time when discharge is performed also using the discharge circuit 40 including the discharge resistor 42 smaller in resistance value than the discharge resistor 32. A voltage Vth (a prescribed voltage) is a threshold voltage at which the line L1 changes into the line L2. In other words, when the voltage VH is equal to or higher than the threshold voltage Vth, discharge is performed by the discharge circuit 30 (the discharge resistor 32). When the voltage VH becomes lower than the threshold voltage Vth, discharge is performed also using the discharge circuit 40 (the discharge resistor 42). Note that the threshold voltage Vth is set by preliminary evaluations in consideration of heat generation and loss in the discharge resistors 32 and 42, and is set at about 400V to 500V, for example.

The above-mentioned change from the line L1 to the line L2 is implemented by the comparator 26 and the switch 44 of the discharge circuit 40. In other words, the comparator 26 compares the voltage VH with the threshold voltage Vth (the prescribed voltage), and when the voltage VH>the threshold voltage Vth, the comparator 26 turns off the switch 44. When the switch 44 is off, discharge by the discharge circuit 40 is not performed, but discharge is performed using only the discharge circuit 30 (the line L1).

On the other hand, when the voltage VH<the threshold voltage Vth, the comparator 26 turns on the switch 44. When the switch 44 is on, discharge by the discharge circuit 40 is performed and discharge using the discharge circuits 30 and 40 is also performed (the line L2).

By performing discharge in two stages using the discharge circuits 30 and 40 in this manner, the loss can be reduced by increasing the resistance value in the discharge circuit 30 (the discharge resistor 32) in a high-voltage region (in which the voltage VH≥the threshold voltage Vth) as compared with the case where discharge is performed by one discharge circuit (the discharge resistor) as indicated by the line L3. Also, when the voltage VH becomes lower than the threshold voltage Vth, the voltage VH can be lowered to the specified voltage V1 within the specified time period t1 by the discharge circuit 40 (the discharge resistor 42) capable of performing discharge at high speed.

However, even such discharge performed in two stages causes the following problems. Specifically, although discharge of the capacitor 22 can be accelerated by reducing the resistance value of the discharge resistor 42 in the discharge circuit 40, there is a limit in reducing the resistance value of the discharge resistor 42 due to restrictions such as heat generation and allowable loss in the discharge resistor 42. When the resistance value of the discharge resistor 42 cannot be reduced, the resistance value of the discharge resistor 32 in the discharge circuit 30 needs to be reduced in order to keep the specified time period for discharge. If the resistance value of the discharge resistor 32 is reduced, however, heat generation and loss in the discharge resistor 32 increase.

Thus, in the discharge device 20 according to the present embodiment, when the voltage VH becomes lower than the threshold voltage Vth, the switch 44 is turned on in the discharge circuit 40 to thereby start discharge by the discharge resistor, and then, after an elapse of the prescribed time period, the switch 44 of the discharge circuit 40 is turned off. Specifically, when the voltage VH becomes lower than the threshold voltage Vth, the comparator 26 turns on the switch 44 of the discharge circuit 40 and starts the built-in timer 28 to count time. Then, when the prescribed time period has elapsed, the comparator 26 turns off the switch 44 of the discharge circuit 40. Thereby, the time period during which heat generation and loss occur in the discharge resistor 42 of the discharge circuit 40 can be limited to the prescribed time period, which eliminates the need to increase the resistance value of the discharge resistor 42 or decrease the resistance value of the discharge resistor 32.

In consideration of the design that the resistance values of the discharge resistors 32 and 42 are set such that the capacitor 22 is discharged starting from the maximum voltage Vmax to the specified voltage V1 within the specified time period t1, the specified time period t1 is sufficient for the prescribed time period from turning-on to turning-off of the switch 44. In the present example, the prescribed time period until turning-off of the switch 44 is set equal to the specified time period t1 (for example, 5 seconds).

Further, even after the switch 44 is turned off after an elapse of the prescribed time period, the capacitor 22 needs to be able to be discharged to attain the specified voltage V1 within the specified time period t1. Thus, the resistance value of the discharge resistor 32 in the discharge circuit 30 is set at a value equal to or smaller than the resistance value at which the capacitor 22 can be discharged starting from the threshold voltage Vth, which is the most strict condition, to the specified voltage V1 within the specified time period t1. Since the larger resistance value allows less heat generation and smaller loss, the resistance value of the discharge resistor 32 is set, for example, at a resistance value at which the capacitor 22 can be discharged starting from the threshold voltage Vth to the specified voltage V1 within the specified time period t1.

Note that the switch 44 that has been turned off after an elapse of the prescribed time period is turned on by the comparator 26 when the voltage VH becomes equal to or higher than the threshold voltage Vth and thereafter the voltage VH again becomes lower than the threshold voltage Vth.

Figure 3:
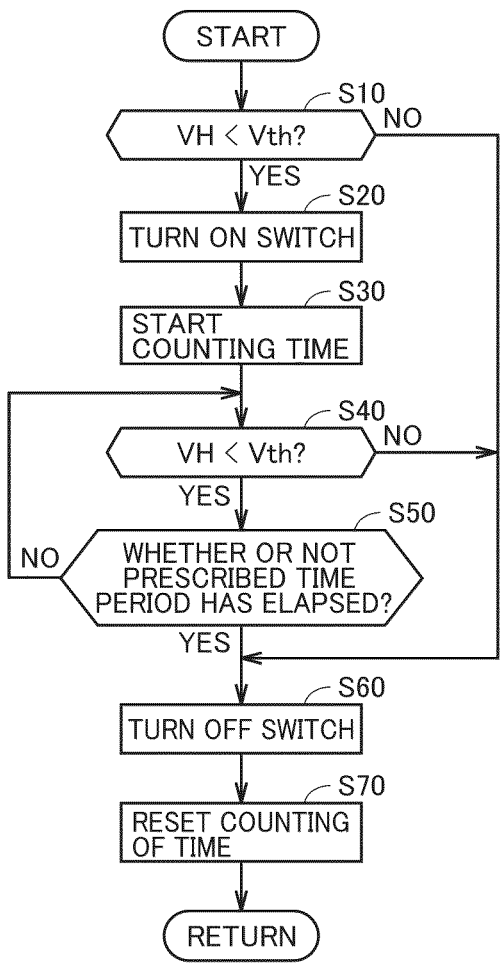
FIG. 3 is a flowchart illustrating an example of a processing procedure executed by a comparator.

FIG. 3 is a flowchart illustrating an example of a processing procedure executed by the comparator 26. A series of processes shown in this flowchart is repeatedly executed every prescribed control cycle or every time a prescribed execution condition is satisfied.

Referring to FIG. 3, the comparator 26 compares a voltage input to the terminal T2 (the SENSE terminal) with a reference voltage to determine whether or not the voltage VH is lower than the threshold voltage Vth (the prescribed voltage) (step S10). When the voltage VH is equal to or higher than the threshold voltage Vth (NO in step S10), the process proceeds to step S60 described later.

When it is determined in step S10 that the voltage VH is lower than the threshold voltage Vth (YES in step S10), the comparator 26 turns on the switch 44 of the discharge circuit 40 (step S20), and starts the built-in timer 28 to count time (step S30).

Also while the timer 28 is counting time, the comparator 26 monitors whether or not the voltage VH is lower than the threshold voltage Vth (step S40). When the voltage VH becomes equal to or higher than the threshold voltage Vth (NO in step S40), the process proceeds to step S60 described later.

When it is determined in step S40 that the voltage VH is lower than the threshold voltage Vth (YES in step S40), the comparator 26 determines whether or not the elapsed time period counted by the timer 28 exceeds the prescribed time period (step S50). When the elapsed time period counted by the timer 28 does not exceed the prescribed time period (NO in step S50), the process is returned to step S40.

When it is determined in step S50 that the elapsed time period counted by the timer 28 exceeds the prescribed time period (YES in step S50), the comparator 26 turns off the switch 44 of the discharge circuit 40 (step S60). As described above, also when it is determined in step S10 or S40 that the voltage VH is equal to or higher than the threshold voltage Vth (NO in step S10 or S40), the switch 44 of the discharge circuit 40 is turned off in step S60. Then, the comparator 26 resets counting by the timer 28 (step S70).

As described above, in the present embodiment, the discharge device 20 that discharges the capacitor 22 includes two discharge circuits 30 and 40. The comparator 26 compares the voltage VH between the pair of power lines PL and NL that is detected by the voltage detection circuit 24 with the threshold voltage Vth. Then, when the voltage VH becomes lower than the threshold voltage Vth, the comparator 26 turns on the switch 44 of the discharge circuit 40. Thereby, while the discharge characteristics of the discharge device 20 are ensured, there is a concern about heat generation and loss in the discharge resistor 42 of the discharge circuit 40. In the present discharge device 20, however, the comparator 26 turns off the switch 44 after an elapse of the prescribed time period since turning on of the switch 44, and thus, the time period during which heat generation and loss occur in the discharge resistor 42 can be limited to the prescribed time period. Therefore, according to the present embodiment, both the discharge characteristics and suppression of loss in the discharge device 20 can be achieved.

Further, in the present embodiment, the discharge resistor 32 of the discharge circuit 30 is configured to lower the voltage VH from the threshold voltage Vth to the specified voltage V1 within the specified time period t1 when the capacitor 22 is discharged through the discharge resistor 32. Thus, even if the switch 44 of the discharge circuit 40 is turned off after an elapse of the prescribed time period since turning on of the switch 44, the capacitor 22 can be discharged to attain the specified voltage V1 by the discharge resistor 32 within the specified time period t1.

Further, in the present embodiment, the Zener diode 34 and the power supply node 36 connected to the cathode of the Zener diode 34 constitute a power supply circuit, and the comparator 26 and the switch 44 receive operating power from the power supply node 36. Thereby, the comparator 26 and the switch 44 can be operated without receiving power supply from an auxiliary power supply system (a low-voltage power supply system). Thus, even when the auxiliary power supply system stops power supply, the comparator 26 and the switch 44 can be operated.

SUPPLEMENTARY NOTES

The above-described embodiment is a specific example described in the following Supplementary Notes.

Supplementary Note 1

A discharge device includes:
a capacitor connected between a pair of power lines;
a first discharge circuit connected in parallel to the capacitor; and
a second discharge circuit connected in parallel to the capacitor,
the first discharge circuit includes a first discharge resistor,
the second discharge circuit includes
a second discharge resistor smaller in resistance value than the first discharge resistor, and
a switch connected in series to the second discharge resistor, the discharge device further includes a drive circuit that
turns off the switch when a voltage between the pair of
power lines is equal to or higher than a prescribed
voltage, and
turns on the switch when the voltage between the pair
of power lines becomes lower than the prescribed
voltage, and
the drive circuit is configured to turn off the switch after
an elapse of a prescribed time period since turning on
of the switch.

Supplementary Note 2

In the discharge device according to Supplementary Note
1,
the first discharge resistor is configured to lower the
voltage between the pair of power lines from the
prescribed voltage to a specified voltage within a
specified time period when the capacitor is discharged
through the first discharge resistor.

Supplementary Note 3

In the discharge device according to Supplementary Note
1 or 2,
the discharge device further includes a power supply
circuit that generates operating power for the drive
circuit and the switch,
the drive circuit includes a timer for counting the pre-
scribed time period,
the power supply circuit includes
a Zener diode connected between the first discharge
resistor and a negative electrode line of the pair of
power lines, and
a power supply node connected to a connection portion
between the first discharge resistor and a cathode of
the Zener diode, and
the drive circuit and the switch receive the operating
power from the power supply node.

Supplementary Note 4

An electric compressor includes:
a refrigerant compression unit;
a motor that drives the refrigerant compression unit;
an inverter that drives the motor; and
the discharge device according to any one of Supplemen-
tary Notes 1 to 3, the discharge device being provided
in a pair of power lines through which electric power is
supplied from a battery to the inverter.

Although the embodiments of the present disclosure have
been described as above, it should be understood that the
embodiments disclosed herein are illustrative and non-re-
strictive in every respect. The technical scope indicated by
the present disclosure is defined by the scope of the claims
and is intended to include any modifications within the
meaning and scope equivalent to the terms of the claims.

What is claimed is:

1. A discharge device comprising:
a capacitor connected between a pair of power lines;
a first discharge circuit connected in parallel to the capaci-
tor; and
a second discharge circuit connected in parallel to the
capacitor, wherein
the first discharge circuit includes a first discharge resis-
tor,
the second discharge circuit includes
a second discharge resistor smaller in resistance value
than the first discharge resistor, and
a switch connected in series to the second discharge
resistor, the discharge device further comprises a
drive circuit that
turns off the switch when a voltage between the pair of
power lines is equal to or higher than a prescribed
voltage, and
turns on the switch when the voltage between the pair
of power lines becomes lower than the prescribed
voltage, and
the drive circuit is configured to turn off the switch after
an elapse of a prescribed time period since turning on
of the switch.

2. The discharge device according to claim 1, wherein the
first discharge resistor is configured to lower the voltage
between the pair of power lines from the prescribed voltage
to a specified voltage within a specified time period when the
capacitor is discharged through the first discharge resistor.

3. The discharge device according to claim 1, further
comprising a power supply circuit that generates operating
power for the drive circuit and the switch, wherein
the drive circuit includes a timer for counting the pre-
scribed time period,
the power supply circuit includes
a Zener diode connected between the first discharge
resistor and a negative electrode line of the pair of
power lines, and
a power supply node connected to a connection portion
between the first discharge resistor and a cathode of
the Zener diode, and
the drive circuit and the switch receive the operating
power from the power supply node.

4. An electric compressor comprising:
a refrigerant compression unit;
a motor that drives the refrigerant compression unit;
an inverter that drives the motor; and
the discharge device according to claim 1, the discharge
device being provided in a pair of power lines through
which electric power is supplied from a battery to the
inverter.

* * * * *